(12) United States Patent
Lundqvist et al.

(10) Patent No.: US 10,724,785 B2
(45) Date of Patent: Jul. 28, 2020

(54) COVER FOR COOLING FINS OF A REFRIGERATOR AND REFRIGERATOR

(71) Applicant: Dometic Sweden AB, Solna (SE)

(72) Inventors: Anton Lundqvist, Älvsjö (SE); Björn Flemsäter, Lidingö (SE); Per Wedby, Sundbyberg (SE); Yongbin Zhang, Zhuhai (CN); Junbao Li, Zhuhai (CN)

(73) Assignee: Dometic Sweden AB, Solna (SE)

( * ) Notice: Subject to any disclaimer, the term of this patent is extended or adjusted under 35 U.S.C. 154(b) by 95 days.

(21) Appl. No.: 15/988,680

(22) Filed: May 24, 2018

(65) Prior Publication Data

US 2018/0347891 A1    Dec. 6, 2018

(30) Foreign Application Priority Data

May 26, 2017 (DE) .......................... 10 2017 208 901

(51) Int. Cl.
  *F25D 23/02* (2006.01)
  *B60N 3/10* (2006.01)
  *F25D 17/06* (2006.01)

(52) U.S. Cl.
  CPC ........... *F25D 23/028* (2013.01); *B60N 3/104* (2013.01); *F25D 17/067* (2013.01);
  (Continued)

(58) Field of Classification Search
  CPC ................. F25D 23/028; F25D 17/067; F25D 2317/0655; F25D 2317/0672;
  (Continued)

(56) References Cited

U.S. PATENT DOCUMENTS 2,234,474 A * 3/1941 Higham .................. F25D 21/08
                                                    62/264
3,216,217 A * 11/1965 Kesling .................. F25D 19/02
                                                    62/289
(Continued)

FOREIGN PATENT DOCUMENTS

AU    201717920    2/2018
AU    201810504    2/2018
(Continued)

OTHER PUBLICATIONS

Design U.S. Appl. No. 29/631,236 "Cover" filed Dec. 28, 2017.
(Continued)

*Primary Examiner* — Emmanuel E Duke
(74) *Attorney, Agent, or Firm* — Middleton Reutlinger

(57) ABSTRACT

The present invention relates to a cover for cooling fins disposed in an interior space of a refrigerator. The cover comprises an inlet portion comprising at least one inlet, wherein said inlet portion is adapted such that an air flow is allowed to enter through said inlet. The cover further comprises an outlet portion comprising at least a first outlet, wherein said first outlet is arranged relative to said inlet such that said air flow is able to exit through said first outlet. The first outlet is configured such that said air flow exiting through said first outlet is directed to at least a first volume in said interior space of said refrigerator. The invention is further directed to a refrigerator for a vehicle having an inventive cover.

18 Claims, 8 Drawing Sheets

(52) U.S. Cl.
CPC .... *F25D 17/062* (2013.01); *F25D 2317/0655* (2013.01); *F25D 2317/0665* (2013.01); *F25D 2317/0672* (2013.01)

(58) Field of Classification Search
CPC ........... F25D 17/062; F25D 2317/0665; F25D 17/00; F25D 2317/00; B60N 3/104; F21V 29/673; F21V 29/50; F21V 29/60; F21V 29/67; F21V 29/677
See application file for complete search history.

(56) References Cited

U.S. PATENT DOCUMENTS

| | | | | |
|---|---|---|---|---|
| 3,403,533 | A | * | 10/1968 | Bollenbacher ........ F25D 17/065 62/408 |
| 3,702,544 | A | * | 11/1972 | Grinups ................ F25D 17/06 62/414 |
| 5,319,937 | A | | 6/1994 | Fritsch et al. |
| 5,784,896 | A | * | 7/1998 | Tronnes ................ F25D 17/062 62/285 |
| 6,094,931 | A | | 8/2000 | Jeong |
| 6,612,116 | B2 | | 9/2003 | Fu et al. |
| 6,918,259 | B2 | | 7/2005 | Anderson et al. |
| 8,196,427 | B2 | | 6/2012 | Bae et al. |
| 8,387,403 | B2 | | 3/2013 | Weiss |
| 2004/0144128 | A1 | * | 7/2004 | Junge ................ F25D 17/045 62/441 |
| 2005/0011219 | A1 | | 1/2005 | Asan et al. |
| 2008/0202149 | A1 | * | 8/2008 | Lim ................... F25D 17/062 62/407 |
| 2009/0133425 | A1 | * | 5/2009 | Goerz ................ F25D 17/067 62/264 |
| 2010/0083687 | A1 | | 4/2010 | Handa et al. |
| 2012/0144859 | A1 | * | 6/2012 | Arslankiray ........ F25D 29/005 62/515 |
| 2014/0373567 | A1 | * | 12/2014 | Otsuki ................ F25D 17/04 62/419 |
| 2015/0143833 | A1 | | 5/2015 | Baker |
| 2016/0091238 | A1 | * | 3/2016 | Simpson ............... F25D 17/045 62/340 |
| 2017/0276421 | A1 | * | 9/2017 | Candeo ................ F04D 29/601 |

FOREIGN PATENT DOCUMENTS

| | | |
|---|---|---|
| AU | 201810506 | 2/2018 |
| AU | 201810507 | 2/2018 |
| AU | 201810509 | 2/2018 |
| AU | 201810512 | 2/2018 |
| AU | 201810513 | 2/2018 |
| DE | 20304566 | 6/2003 |
| DE | 102005057155 | 5/2007 |
| DE | 102007041453 A1 | 3/2009 |
| DE | 102009029124 | 3/2011 |
| DE | 102012012103 A1 | 11/2013 |
| EA | 004077170 | 7/2017 |
| EP | 2662648 A1 | 11/2013 |
| KR | 100362612 | 11/2002 |

OTHER PUBLICATIONS

German Patent Application No. 102017208901.6 "Cover for cooling fins of a refrigerator and refrigerator" filed May 26, 2017.
Design U.S. Appl. No. 29/631,238 "Refrigerator Freezer Appliance" filed Dec. 28, 2017.
State Intellectual Property Office of People's Republic of China; English translation for Notification of the First Office Action for Chinese Patent Application No. 201730679685.1 dated May 23, 2018.
Australian Application No. 2018202358 "Cover for cooling fins of a refrigerator and refrigerator " filed Apr. 4, 2018.
DE Office Action Mailed in Application No. 10 2017 208 901.6 dated Aug. 17, 2017.
DE Examination Report Mailed in Application No. 10 2017 208 901.6 dated Aug. 5, 2019.
DE Examination Report Mailed in Application No. 10 2017 208 901.6 dated Jan. 18, 2018.

* cited by examiner

COVER FOR COOLING FINS OF A REFRIGERATOR AND REFRIGERATOR

PRIORITY CLAIM

This non-provisional patent application claims priority to and benefit of, under 35 U.S.C. § 119(e), German patent application number DE 10 2017 208 901.6, filed May 26, 2017, titled, "Cover for Cooling Fins of a Refrigerator and Refrigerator", all of which is incorporated by reference herein.

BACKGROUND

The present invention relates to a cover for cooling fins disposed in an interior space of a refrigerator. In addition, the present invention relates to a refrigerator comprising an inventive cover. The refrigerator is preferably for a vehicle, and in particular for a recreational vehicle, e.g. campers, motorhomes, boats and the like. Such refrigerators have a housing which defines an interior space. Within said interior space different goods to be cooled can be stored, for example foodstuff or beverages.

To achieve a good cooling of the interior space, such refrigerators are equipped with active air circulation. Therefore, the refrigerators comprise an air circulation device having an inlet connected to the interior space and a first outlet connected to the interior space, wherein the air circulation device is configured to guide an air flow from the interior space through the inlet to the cooling unit and back to the interior space thorough the first outlet. Frankly, the air of the interior space is thus sucked through an inlet to a cooling unit. There, the air is cooled and then blown off back to the interior space through the first outlet. The cooling unit could for instance be a cold heat exchanger. An refrigerator with air circulation is known, for example from DE 10 2007 041 453 A1, which however is not particularly suitable to be used in a vehicle, as there are certain requirements, for example concerning tightness and leakage caused by vibrations due to movement of the vehicle.

However, such refrigerators do not allow for rapidly cooling down something. This is sometimes inconvenient for the users of the vehicle, as the interior space is often limited so that one may not ensure that a sufficient amount of sufficiently cooled goods is available when needed. For instance, in case one has a barbecue outside and the need for cooled beverages is increased, it might not be warranted that a beverage placed in the interior space to replace a beverage which has been taken out is conveniently tempered within a rather short time frame.

Thus, the present invention is intended to provide a refrigerator for a vehicle having an air circulation and the possibility to rapidly cool down goods placed within the interior space of the refrigerator.

SUMMARY

The problem is solved by a cover according to claim 1 and a refrigerator according to claim 8. Preferred embodiments are described in the dependent claims.

The inventive cover is a cover for cooling fins disposed in an interior space of a refrigerator and is further characterized in that said cover comprises an inlet portion comprising at least one inlet, wherein said inlet portion is adapted such that an air flow is allowed to enter through said inlet. The cover comprises an outlet portion comprising at least a first outlet. Said first outlet is arranged relative to said inlet such that said air flow is able to exit through said first outlet. Said first outlet is configured such that said air flow exiting through said first outlet is directed to at least a first volume in said interior space of said refrigerator. Thus, a first volume of the refrigerator can be quickly chilled by the air flow exiting through the first outlet.

In some embodiments, the cover comprises a second outlet, wherein said second outlet is arranged relative to said inlet such that said air flow is able to exit through said second outlet. Said outlet is configured such that said air flow exiting through said outlet is directed to a second volume in said interior space of said refrigerator.

Thus, when the cover is installed within the refrigerator, the latter one is divided into at least two volumes, wherein the first volume is cooled be that portion of the cooled air flow exiting through the first outlet. The second volume can be cooled by the cooled air flow exiting through the second outlet. The cover is preferably configured to selectively guide a portion of the cooled air flow through the first outlet back to the interior space, so that respective goods to be quickly cooled down are preferably placed in the first volume. In this regard, it is preferable that the first volume is smaller than the second volume. Thus, the first volume constitutes a quick chill volume, wherein the second volume is a normal cooling volume. In addition, the first volume can be a first compartment and the second volume can be a second compartment. In other word, the first volume and the second volume can be separate compartments which are arranged within the interior space.

In some embodiments, the first outlet and the second outlet are arranged so that the direction of the air flow exiting the first outlet substantially perpendicular to the direction of the air flow exiting the second outlet. Thus, goods to be cooled down rapidly are placed into the first volume directly in front of the first outlet, so that said products are quickly tempered.

In some embodiments, said inlet portion is detachably arranged on said outlet portion. Thus, the inlet portion can be exchanged depending to achieve a different design. In addition, this allows for facilitated maintenance.

In some embodiments, said inlet portion and/or said outlet portion comprises a lightning. Thus, the interior space of the refrigerator can be illuminated when the cover is installed thereto which is convenient for placing and removing goods.

In some embodiments, said cover comprises a fan, wherein said fan is configured to generate said air flow. A fan is a rather cheap and simple means to generate the air flow. The fan can be associated to the inlet portion or the outlet portion.

In some embodiments, the cover comprises blocking structure so that the portion of air flow exiting through the first outlet and the second outlet can be freely split. Accordingly it can be freely chosen which amount of the cooled air flow is guided to the first volume and to the second volume. Thus, the first volume could even be set about inactive in case a rapid cooling is for the moment not needed.

The inventive refrigerator for a vehicle has a housing defining the interior space, a cooling unit having cooling fins and an a cover according to any one of the preceding claims, wherein the inlet is connected to the interior space and the first outlet is connected to the interior space, wherein the cover is configured to guide the air flow from the interior space through the inlet to the cooling fins of the cooling unit and back to the interior space thorough the first outlet, wherein the first outlet is arranged within the interior space so that the first volume of the interior space is cooled by the portion of the air flow exiting through the first outlet. Thus, the first volume of the refrigerator can be quickly chilled by the air flow exiting through the first outlet. In the sense of the invention, the cover can be an integrated component or a component being separate from the remainders of the refrigerator.

In some embodiments, the cover comprises a second outlet connected to the interior space and is further configured to selectively guide a portion of the air flow to the interior space through the second outlet wherein the second outlet is arranged within the interior space so that a second volume of the interior space is cooled by the portion of the air flow existing through the second outlet. Hence, the identical advantages as mentioned above in terms of the inventive cover are prevailing, namely that respective goods to be quickly cooled down are preferably placed in the first volume.

In some embodiments, the cooling fins are arranged in the interior space, so that the air flow is guided along said cooling fins. This allows for a superior cooling effect. The cooling fins may also be arranged within the air circulation device. When the air flow is guided along the cooling fins, an ameliorated heat transfer is achieved so that an improved cooling of the air flow is achieved.

In some embodiments, the second outlet is arranged within the interior space so that the air flow exits the first outlet in a direction substantially parallel to the vertical axis of the refrigerator. Thus, the second outlet blows the air downwards which allows for a good homogenization of the air within at least the second volume of the interior space. In addition, it is thus prevented that the portion of air flow used for the normal cooling in the second volume is not blown out the refrigerator when the latter one is opened.

In some embodiments, the first outlet is arranged within the interior space so that the air flow exits the first outlet in a direction substantially perpendicular to the vertical axis of the refrigerator. Thus, goods to be cooled down rapidly are placed into the first volume directly in front of the first outlet, so that said products are quickly tempered.

In some embodiments, the interior space has a bottom wall, a first side wall, a second side wall and a ceiling wall, wherein the inlet is disposed at the ceiling wall. As warm air moves upwardly in the refrigerator, it is ensured that the warmest air is guided to the cooling unit, and preferably along the cooling fins of the cooling unit, through the inlet. Thus, an overall superior cooling efficiency is achieved.

In some embodiments, the first side wall and the second side wall each have at least one supporting means, for example in the form of a recess for a shelf or the like, wherein the first outlet is disposed between the supporting means and the ceiling wall along the vertical axis of the refrigerator. In case a shelf or the like is introduced into the supporting means the goods to be quickly cooled down can be placed on the shelf so that they are disposed closely to the first outlet. This further ameliorated the cooling of the goods placed in the first volume.

In some embodiments, the second outlet is disposed between the bottom wall and the first outlet along the vertical axis of the refrigerator. Thus, second volume is disposed below the first volume within the interior space.

In some embodiments, the first outlet has an outlet profile which is adjustable in size and location between the first and second side wall. Thus, the portion of air flow exiting into the interior space through the first outlet can be concentrated to a specific location within the interior space, so that very fast cooling of goods placed there can be achieved.

In some embodiments, the refrigerator comprises a deflection means which can be inserted into the supporting means so that the air flow exiting through the second outlet is at least partially deflected. Thus, the cooled air flow exiting through the second outlet could be deflected e.g. in a direction towards the first volume. For instance, the deflection means can be a part of a shelf or the like which is pushed further into the interior space in case one wants to deflect the air flow exiting through the second outlet.

In some embodiments, the refrigerator further comprises channeling means which channel the air flow exiting through the first outlet into the interior space. In this regard, the channeling means preferably comprises at least one plate-like separator which is laterally moveable along the first outlet. Further, it is preferable that the channeling means comprises a box having a preferably U-shaped cross section which can be disposed within the interior space, preferably within the first volume. Thus, the air flow exiting through the first outlet is channeled so that it does not readily mix with the remaining air within the interior space. Thus, the goods placed in the channeled air flow are rapidly cooled down.

BRIEF DESCRIPTION OF THE DRAWINGS

Next, the invention will be further described with reference to a specific embodiment shown in the drawings, wherein schematically

DETAILED DESCRIPTION

Figure 1:
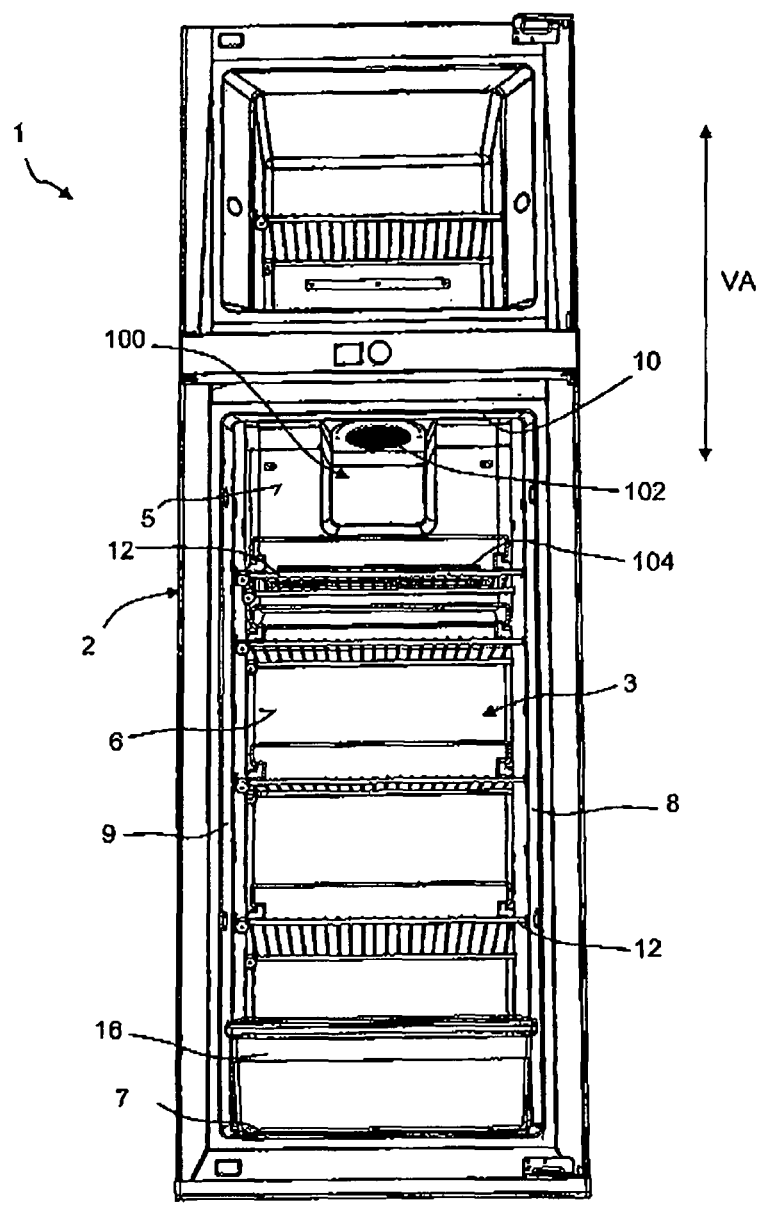
FIG. 1 is a perspective view of a refrigerator with cut free door.

In FIG. 1 there is shown a refrigerator 1 for a recreational vehicle according to the present invention. The refrigerator 1 has a housing 2 which defines an interior space 3. Generally, the interior space 3 is sealed by a door, which is not displayed for lucidity reasons. The interior space 3 has a bottom wall 7, a first side wall 8, a second side wall 9 and a ceiling wall 10. Along the vertical axis VA of the refrigerator there are provided a plurality of supporting means, in this embodiment in form of recesses 11 at the first side wall 8 and the second side wall 9. As shown in FIG. 1, the recesses 11 are configures so that shelves 12, drawers 16 and the like can be disposed within the interior space 3. The goods to be cooled are placed on the shelves 12 or in the drawer 16.

Figure 4:
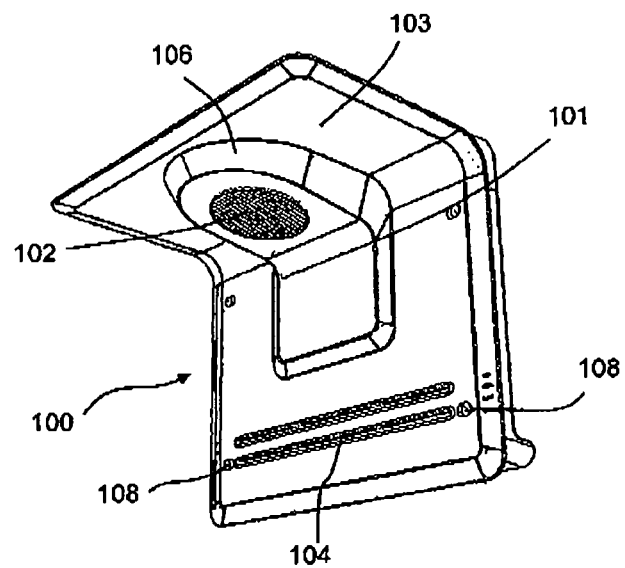
FIG. 4 is a first perspective view of cover according to the invention.
Figure 5:
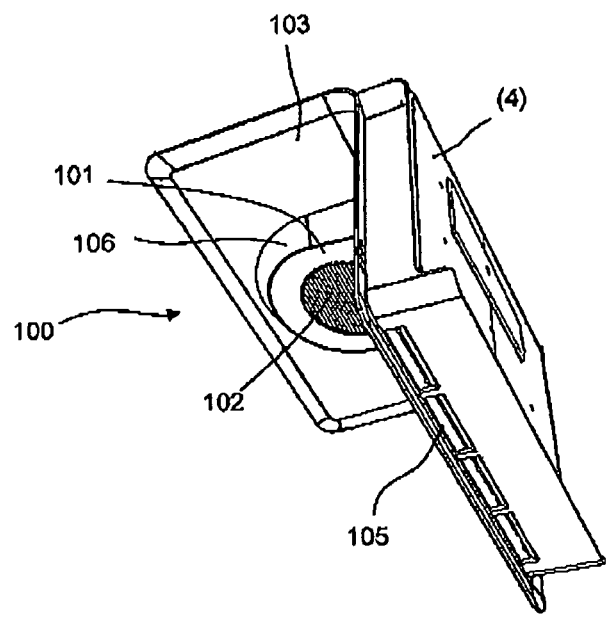
FIG. 5 is a second perspective view of the cover.
Figure 6:
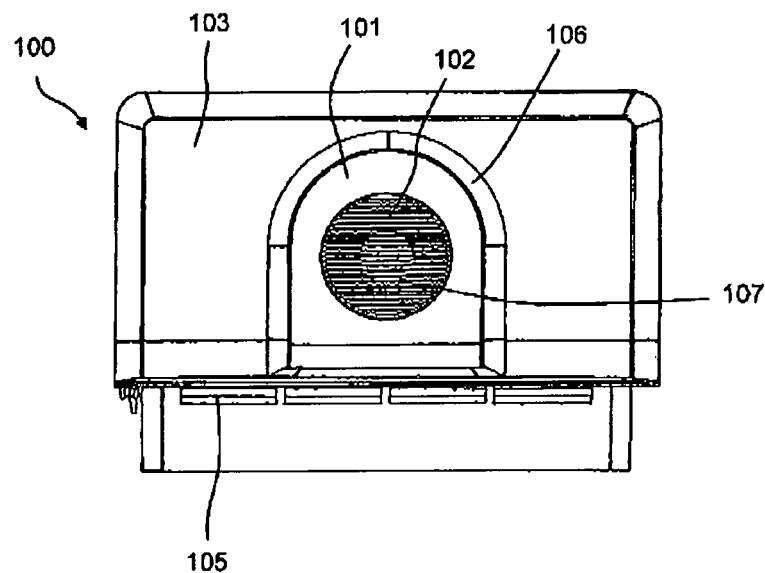
FIG. 6 is a bottom view of the air cover.
Figure 7:
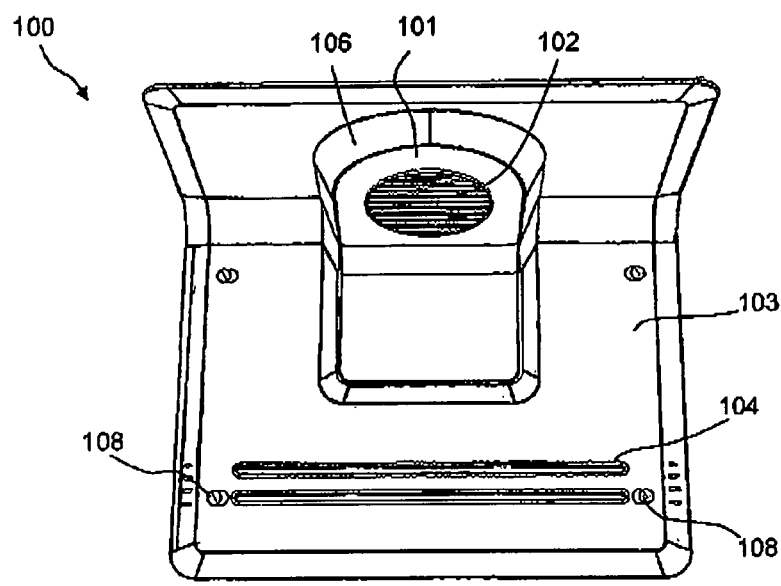
FIG. 7 is third perspective view of the cover.
Figure 8:
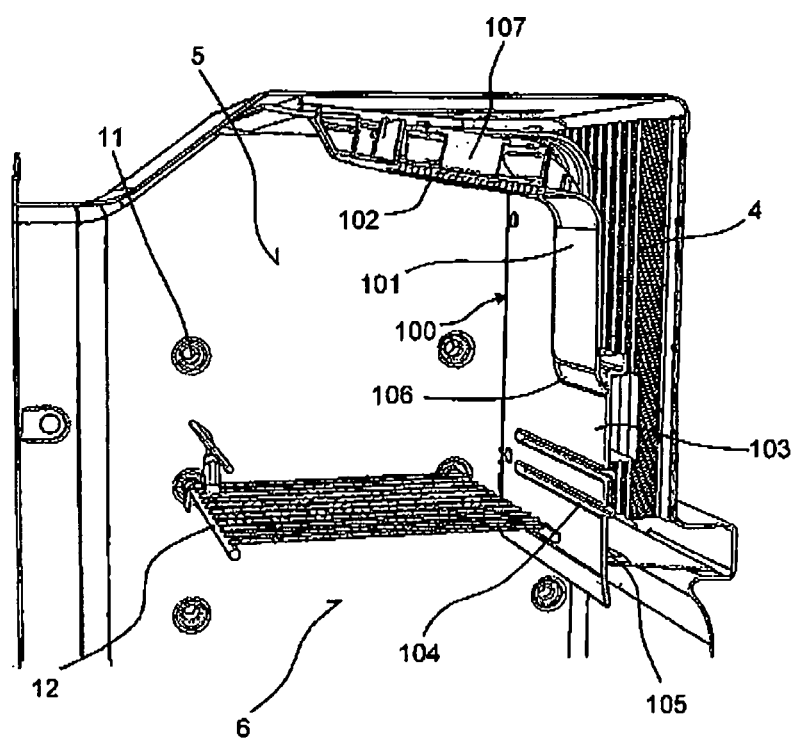
FIG. 8 is a first cross section through the refrigerator and the cover.
Figure 9:
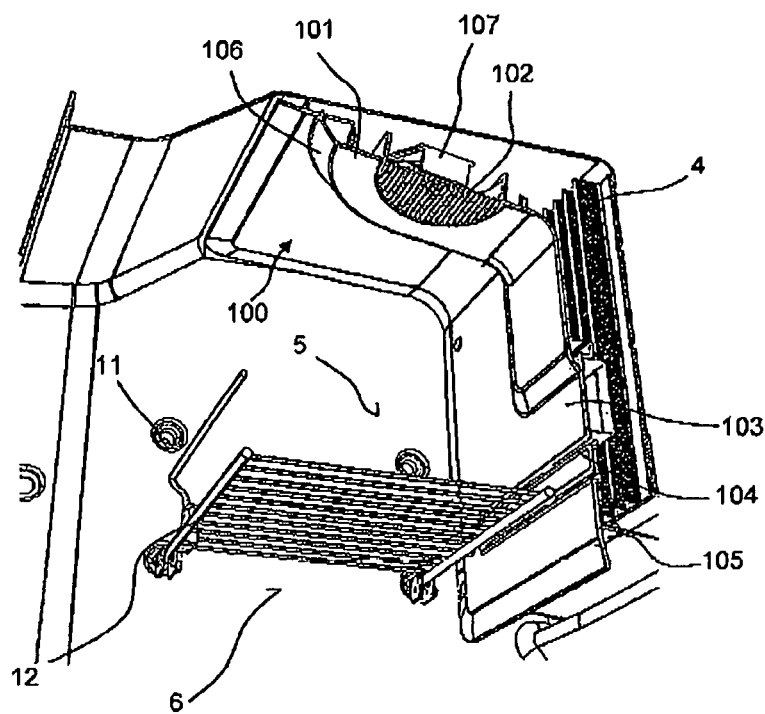
FIG. 9 is a second cross section through the refrigerator and the cover.
Figure 10:
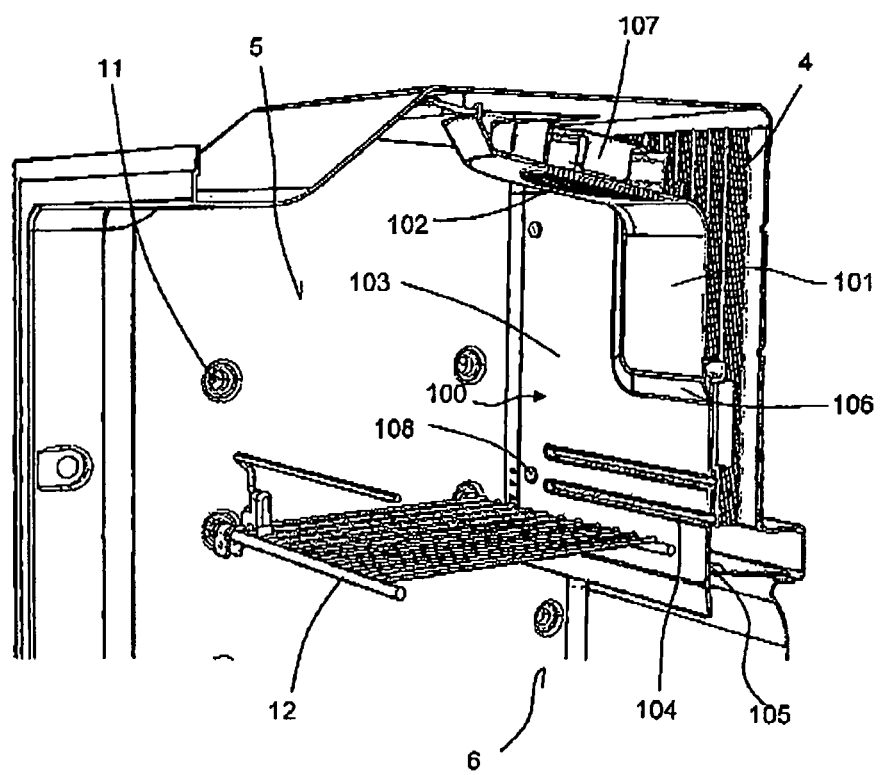
FIG. 10 is a third cross section through the refrigerator and the cover.

Furthermore, a cover 100 is provided within the interior space 3. The cover 100 is shown as an individual view in FIGS. 4 to 7 and is an L-shaped member mounted within the interior space 3 in FIGS. 1 to 3 and 8 to 10. The cover 100 comprises an inlet portion 101 and an outlet portion 103. In this embodiment, the inlet portion 101 is an air circulation device and has an inlet 102 which is disposed at the ceiling wall 10 when the cover 100 is mounted within the interior space 3. As can be seen in FIGS. 6 and 8 to 10, the inlet portion 101 comprises a fan 107 which is disposed next to the inlet 102. The fan 107 generates an air flow and sucks air from the interior space 3 into the inlet 102. The air flow is then guided within the outlet portion 103 to a cooling unit of the refrigerator. In particular along cooling fins 4 (cf. FIGS. 8 to 10) of the cooling unit (not shown) where the air is cooled down. The cooling fins 4 are part of the cooling unit and are disposed within the interior space 3 of the refrigerator. When the cover 100 is mounted within the interior space 3, the cooling fins 4 are further completely surrounded by the cover 100, as can be seen in FIGS. 8 to 10. The cooling fins 4 include a plate like base member, as can be seen in FIG. 5.

The outlet portion 103 further comprises a first outlet 104 (of. FIG. 4) and a second outlet 105 (cf. FIG. 5) through which the cooled air flow can exit the cover 100 to the interior space 3 again. In particular, as can be seen in FIGS. 4 and 5, the first outlet 104 and the second outlet 105 are part of the outlet portion 103 of the cover 100. Thus, the air enters the inlet portion 101 by means of the fan 107 and is further guided within the outlet portion 103 along the cooling fins 4 and may then exit through the first outlet 104 and the second outlet 105. As shown in FIGS. 8 to 10, the cover 100 is mounted within the interior space 3 of the refrigerator 1 so that the cooling fins 4 of the cooling unit are completely covered. Hence, the air flow generated by the fan 107 is guided along the cooling fins 4 before exiting through the first outlet 104 or the second outlet 105 back to the interior space 3.

Furthermore, the cover 100 comprises a lightning 106. In this embodiment, the lightning 106 is a circumferential light band and is part of the outlet portion 103. The inlet portion 101 is removable attached to the outlet portion 103 so that one may remove the inlet portion 101, for example for maintenance of the fan 107 or the lightning 106 or in order to exchange the inlet portion 101 against another inlet portion, for example having a different style or material.

In this embodiment, the second outlet 105 is composed of a single row of four outlet openings and the first outlet 104 is composed of two rows, each row having a plurality of outlet openings. When mounted in the interior space 3, the second outlet 105 faces the bottom wall 7 so that the portion of cooled air flow exiting through the second outlet 105 is guided into the interior space 3 substantially parallel to the vertical axis VA of the refrigerator 1. The first outlet 104 is disposed on the front portion of the cover 100, so that the first outlet 104 faces the (not shown) door of the refrigerator 1 when being closed. Thus, the portion of cooled air flow exiting through the first outlet 104 is guided into the interior space 3 substantially perpendicular to the vertical axis VA of the refrigerator 1 or the direction of the air flow exiting the second outlet 105 respectively.

Figure 2:
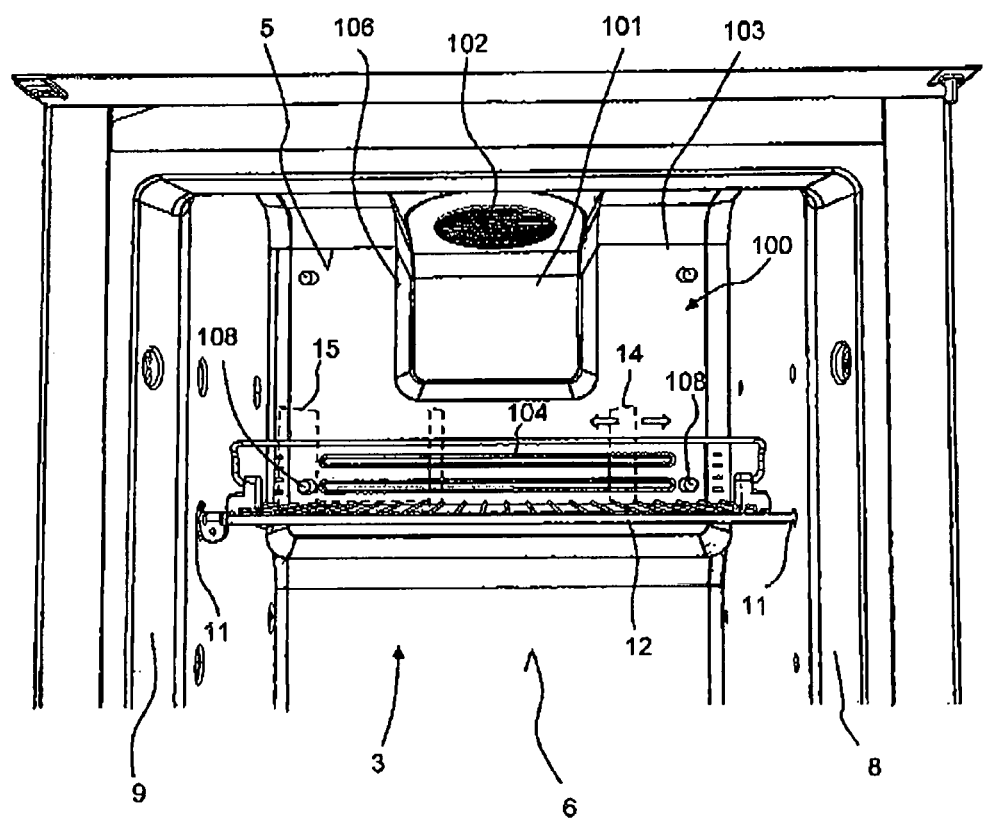
FIG. 2 is an enlarged view of a portion of the refrigerator shown in FIG. 1.

As shown in FIG. 1 and FIG. 2, the interior space 3 is thus divided into a first volume 5 and a second volume 6. The portion of air flow exiting through the first outlet 104 is guided into the first volume 5 and the portion of air flow exiting through the second outlet 105 is guided into the second volume 6. Thus, the first volume 5 is cooled by the air flow of the first outlet 104 and the second volume 6 is cooled by the air flow of the second outlet 105.

As can be seen in FIG. 2, there are recesses 11 provided which support a shelf 12 in the interior space 3. The shelf 12 is mounted below the second outlet 105 along the vertical axis VA of refrigerator 1. Goods to be rapidly cooled can be placed on the shelf 12 directly in front of the first outlet 104 so that freshly cooled air exiting through the first outlet 104 quickly tempers the goods.

The cover 100 is further configured so that the portion of air flow exiting to the interior space 3 through the first outlet 104 can be freely chosen. Therefore, the cover 100 comprises blocking structure 108 operatively connected to flaps. In this embodiment, the blocking structure 108 are in the form of buttons to be operated by the user. However, it is also possible to operate the blocking structure 108 by other mechanically or electrically controlled means, for example by a slider or an electrically controlled motor to be operated by the user or automatically. Operating those buttons opens and closes the first outlet 104 to a specific degree as the respective flaps are moved. Thus, the outlet profile of the first outlet 104 is adjustable in size and location. When completely closed, the entire air flow sucked from the interior space 3 through the inlet 102 exits the cover 100 only through the second outlet 105. As a matter of course, the blocking structure 108 could also be composed of cap members or the like which are placed on the two rows having the plurality of outlet openings composing the first outlet 104. This also allows to adjust the size and location of the outlet profile of the first outlet 104 relative to the interior space 3. In addition, respective blocking structure 108 can also be provided to close a part or the entirety of the second outlet 105.

Figure 3:
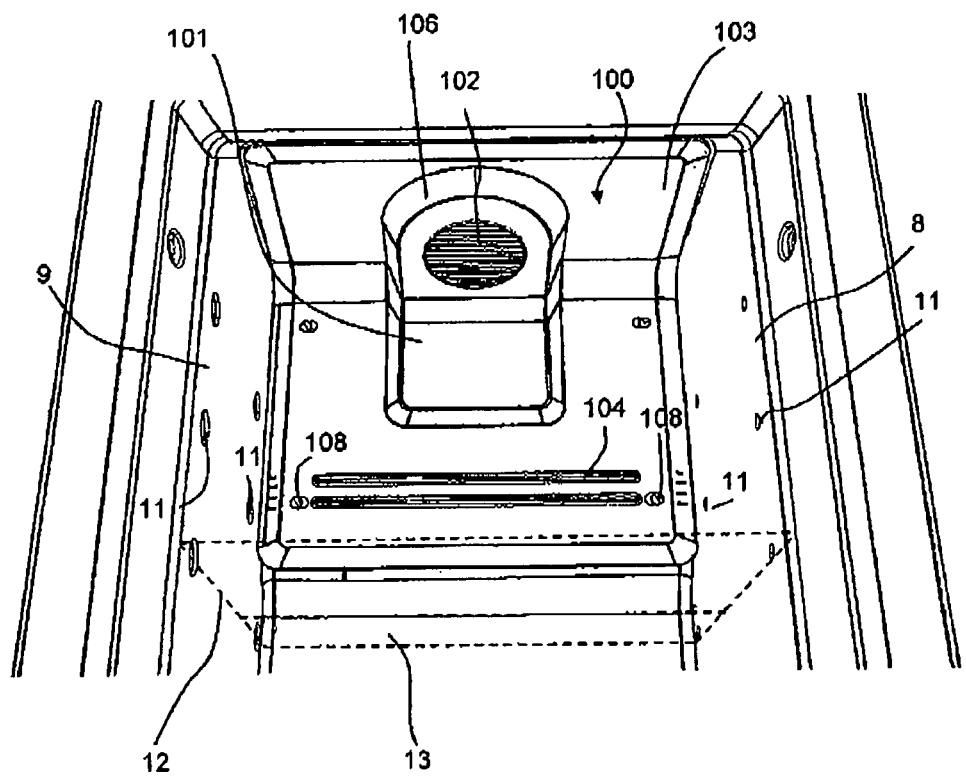
FIG. 3 is a different view of the portion shown in FIG. 2 without shelf.

Furthermore, there could also be provided a deflection means 13 which is attached to the shelf 12 as shown by dashed lines in FIG. 3. The deflection means 13 is composed of a solid material and is disposed between the bottom wall 7 and the first outlet 104 so that the air flow exiting through the second outlet 105 is deflected e.g. towards the first volume 5. In particular, to activate the deflection of the air flow exiting through the second outlet 105, the deflection means 13 is introduced into the interior space 3 so that it is disposed directly below the second outlet 105.

Furthermore, as denoted by dashed lines in FIG. 2 the refrigerator can comprise channeling means 14, 15 which channel the portion of air flow exiting through the first outlet 104. The channeling means can comprise a plate-like separator 14 which is laterally movable along the first outlet 104 between the first side wall 8 and the second side wall 9, as denoted by the bold arrows in FIG. 2. For instance, the goods to be rapidly cooled are placed on the shelf 12 between the separator 14 and the second side wall 9. Thus, it is preferable that the part of the first outlet 104 disposed between the separator 14 and the first side wall 6 is blocked, so that the cooled air flow exits through the first outlet 104 into that portion of the first volume 5 the goods to be rapidly cooled are placed in.

Additionally, the channeling means can be composed of a box 15 having a U-shaped cross section. Thus, the box 15 has a bottom wall and two side walls protruding in parallel from the bottom wall, but no front wall, back wall or ceiling wall. The box 15 is placed directly on the shelf 12 in front of the first outlet 104 so that the part of the cooled air flow exiting the respective portion of the first outlet 104 is channeled within the box 15. Thus, goods placed into the box 15 are rapidly cooled.

LIST OF REFERENCE SIGNS 1 refrigerator
2 housing
3 interior space
4 cooling fins 5 first volume
6 second volume
7 bottom wall
8 first side wall
9 second side wall
10 ceiling wall
11 supporting means/recess
12 shelf
13 deflection means
14 separator
15 channeling box
16 drawer
100 Cover
101 inlet portion
102 inlet
103 outlet portion
104 first outlet
105 second outlet
106 lightning
107 fan
108 blocking means
VA vertical axis

The invention claimed is:

1. A cover for cooling fins disposed in an interior space of a refrigerator for a vehicle, comprising:
an inlet portion comprising at least one inlet within said interior space, wherein said inlet portion is adapted such that an air flow is allowed to enter through said at least one inlet;
an outlet portion comprising at least a first outlet, wherein said first outlet is arranged relative to said at least one inlet such that said air flow is able to exit through said first outlet;
said inlet portion and at least one inlet positioned in a first orientation and said outlet portion and said at least a first outlet positioned in a second orientation, substantially perpendicular to said first orientation, and said inlet portion connected to said outlet portion;
wherein said first outlet is configured such that said air flow exiting through said first outlet is directed to at least a first volume in said interior space of said refrigerator; and a second outlet, wherein said second outlet is arranged relative to said at least one inlet such that said air flow is able to exit through said second outlet;
wherein said second outlet is configured such that said air flow exiting through said first outlet is directed to a second volume in said interior space of said refrigerator.

2. The cover according to claim 1, wherein the first outlet and the second outlet are arranged so that the direction of the air flow exiting the first outlet substantially perpendicular to the direction of the air flow exiting the second outlet.

3. The cover according to claim 1, wherein said inlet portion is detachably arranged on said outlet portion.

4. The cover according to claim 1, wherein at least one of said inlet portion or said outlet portion comprises a lighting.

5. The cover according to claim 1, further comprising a fan, wherein said fan is configured to generate said air flow.

6. The cover according to claim 1, further comprising a blocking structure so that a portion of the air flow exiting through the first outlet and the second outlet can be split.

7. A refrigerator for a vehicle comprising a housing defining an interior space, a cooling unit having cooling fins, and a cover, wherein an inlet is connected to the interior space and a first outlet is connected to the interior space, wherein the cover is configured to guide an air flow from the interior space through the inlet to the cooling fins of the cooling unit and back to the interior space thorough the first outlet, wherein the first outlet is arranged within the interior space so that a first volume of the interior space is cooled by a portion of the air flow exiting through the first outlet, wherein said inlet is configured to be positioned along a first wall of the interior space and the first outlet is configured to be positioned along a second wall of the interior space, connected to the first wall; and wherein the cover comprises a second outlet connected to the interior space and is further configured to selectively guide a second portion of the air flow to the interior space through the second outlet, wherein the second outlet is arranged within the interior space so that a second volume of the interior space is cooled by the second portion of the air flow exiting through the second outlet.

8. The refrigerator according to claim 7, wherein the second outlet is arranged within the interior space so that the air flow exits the second outlet in a direction substantially parallel to a vertical axis (VA) of the refrigerator.

9. The refrigerator according to claim 7, wherein the cooling fins are arranged in the interior space.

10. The refrigerator according to claim 7, wherein the first outlet is arranged within the interior space so that the air flow exits the first outlet in a direction substantially perpendicular to a vertical axis (VA) of the refrigerator.

11. The refrigerator according to claim 7, wherein the interior space has a bottom wall, a first side wall, a second side wall and a ceiling wall, wherein the inlet is disposed at the ceiling wall.

12. The refrigerator according to claim 11, wherein the first side wall and the second side wall each have at least one supporting structure for a shelf or the like, wherein the first outlet is disposed between the at least one supporting structure and the ceiling wall along a vertical axis (VA) of the refrigerator.

13. The refrigerator according to claim 12, wherein the first outlet has an outlet profile which is adjustable in size and location between the first side wall and the second side wall.

14. The refrigerator according to claim 12, wherein the refrigerator comprises a deflection structure which can be inserted into a supporting structure so that the air flow exiting through the second outlet is at least partially deflected.

15. The refrigerator according to claim 11, wherein the second outlet is disposed between the bottom wall and the first outlet along a vertical axis (VA) of the refrigerator.

16. The refrigerator according to claim 7, wherein the refrigerator further comprises a channeling structure which channel the air flow exiting through the first outlet into the interior space.

17. The refrigerator according to claim 7, wherein the channeling structure comprises at least one plate-like separator which is laterally moveable along the first outlet.

18. The refrigerator according to claim 7, wherein the channeling structure comprises a box having a preferably U-shaped cross section which can be disposed within the interior space.

* * * * *